2 Sheets—Sheet 1.
J. BUNDY.
COUPLING FOR CARRIAGES.
No. 48,653. Patented July 11, 1865.
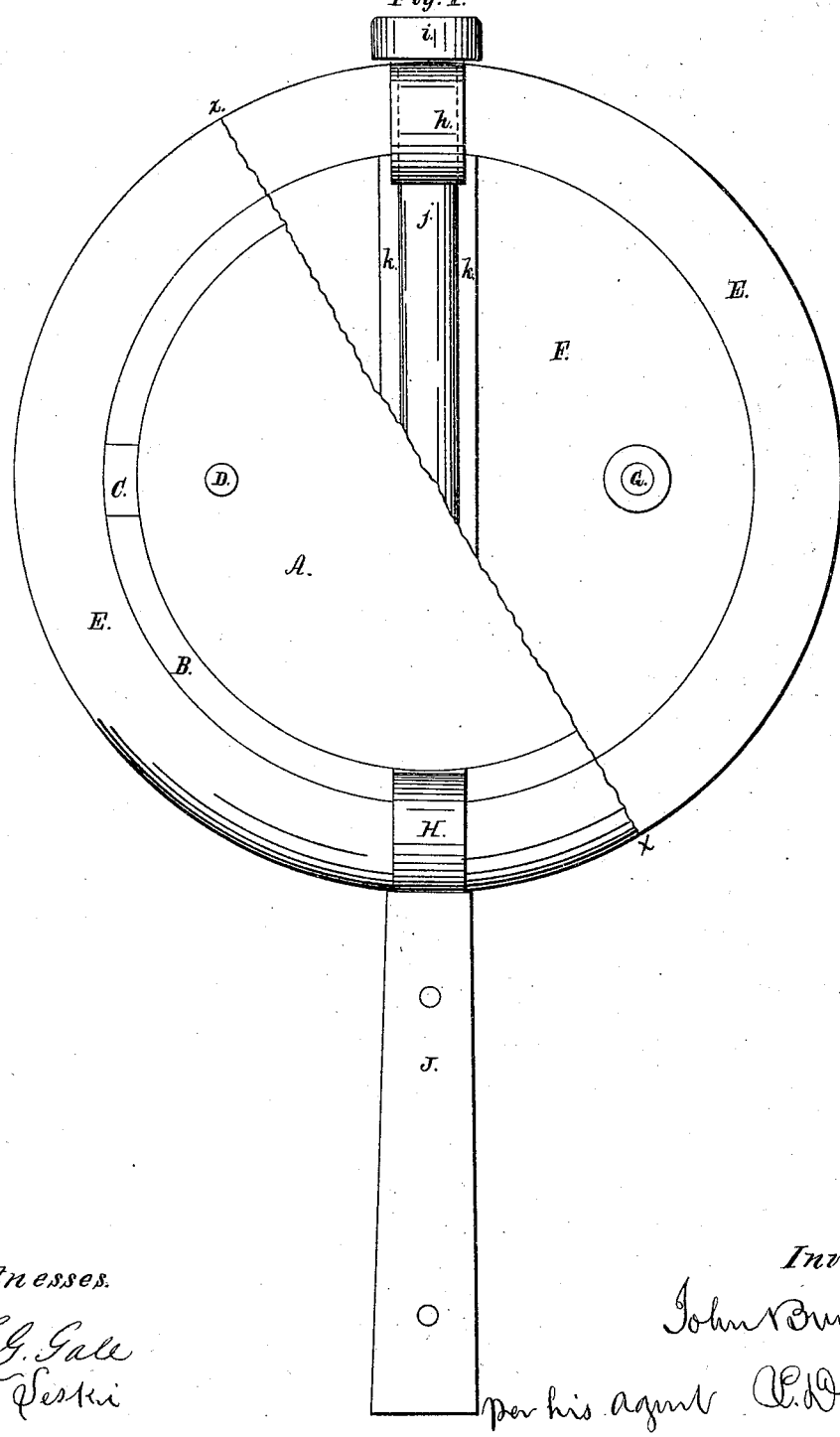
Witnesses.
E. G. Gale
W. Sester
Inventor.
John Bundy
per his agent E. G. Gale

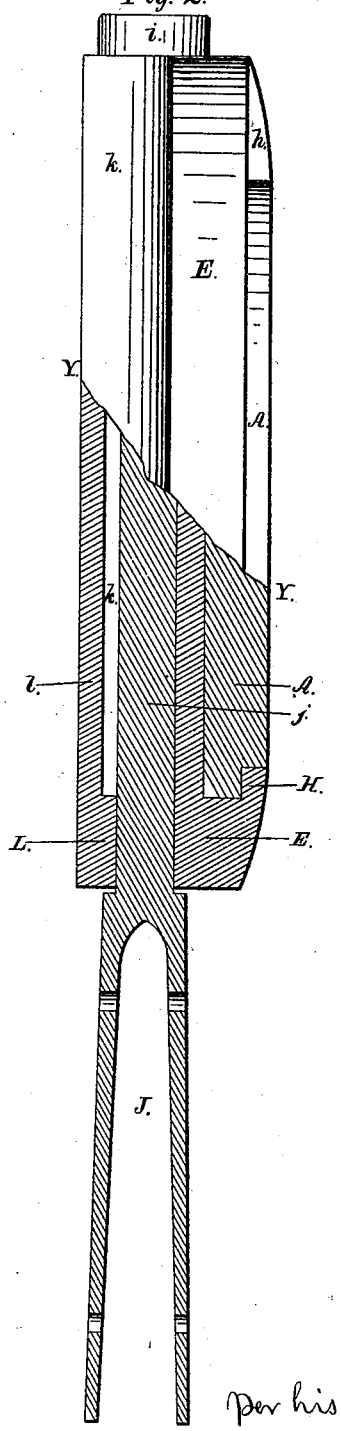

UNITED STATES PATENT OFFICE.

JOHN BUNDY, OF IRONDEQUOIT, NEW YORK.

IMPROVEMENT IN COUPLINGS FOR CARRIAGES.

Specification forming part of Letters Patent No. 48,653, dated July 11, 1865.

*To all whom it may concern:*

Be it known that I, JOHN BUNDY, of Irondequoit, in the county of Monroe and State of New York, have invented a new and improved coupling for the connection of the forward bolster or spring-block with the forward axle, and for the connection of the forward axle and bolster or spring-block with the reach from the axle of the hind wheels of all kinds of four-wheeled carriages and vehicles; and I do hereby declare that the following is a full and exact description of the construction and operation of the same, reference being had to the accompanying drawings, making a part of this specification, in which—

Figure 1 on the left of line $x\,x$ represents a surface or vertical view of the coupling, bottom side up.

The letters E E and F represent a compound circular metallic plate, with flange E E raised above the bed of the plate F. The letters A B represent a smaller circular metallic plate fitted to revolve against the bed F and within the flange E E of the larger circular plate.

H $h$ are lock-flanges on the larger plate, which fit to a rabbet, B, on the periphery of smaller plate, whereby the smaller plate is confined to its place and at the same time permitted to revolve.

C is a notch in the periphery of the smaller plate, by which it may be slipped over the lock-flanges H $h$, as seen in drawings, to its place.

D is orifice through which smaller plate is to be fastened to bolster, and G orifice through which larger plate is fastened to the axle.

J $j$ is arm or rod by which the coupling is connected with reach from the axle of hind wheels, and $i$ a nut which fastens the rod at the forward end.

K $k$ is box let into the bolster, in which the rod $j$ revolves.

The lower section of Fig. 1 represents the under surface of the coupling with the smaller circular plate in place. The upper section represents the same surface with the smaller plate removed.

The lower portion of Fig. 2 represents a longitudinal section of the coupling drawn through the center of the rod J $j$.

The same letters represent the same parts as in Fig. 1

L $l$ represent the raised part or box through which the rod J $j$ extends.

The upper portion of Fig. 2 gives a side view, in perspective, of a forward portion of the coupling.

The coupling designed by this invention may be made of brass, iron, or any other suitable metallic substance. It consists of a smaller circular plate to be fastened to the upper surface of the forward axle at the center by means of screws or bolts, of a larger circular plate to be fastened in like manner to the bolster or spring-block immediately over the smaller plate, and of an arm or rod extending through a longitudinal excavation or box along the back of the larger plate, fastened in front by a nut, and connecting in the rear with the reach from the hind axle. The heads of the screws or bolts by which the plates are fastened are sunk in the plates, so as not to interfere with the revolution of the smaller plate. The smaller plate is made to fit within the rim (E E of Fig. 1) of the larger plate, and the latter rests upon the upper surface of the former. Two lock-flanges reach over from the rim of the outer and larger plate to a little within the circumference of the inner and smaller plate, fitted to a rabbet on the edge of that plate. Notches corresponding to the lock-flanges are cut in the rim of the inner plate, by means of which it may be slipped to its place. The smaller plate, being in place, may revolve within the larger plate. The two plates being put together, and the smaller plate being turned so as to remove the notches from the lock-flanges, these plates, and the axle and bolster to which they are attached are securely bound together by the lock-flanges, and while the said parts are thus fastened together, in consequence of the revolution permitted to the smaller and inner plate, ample provision is made for the varying forward and backward movements of the two ends of the axle below. In practical operation the smaller plate may be so fastened upon the axle that upon a wheel being removed the axle with the plate may be so turned as to bring the notches and the lock-flanges together, thus permitting the axle and bolster to be taken apart or put together, but when both wheels are on the notches and lock-flanges cannot be brought together.

This coupling is connected with the reach from the hind wheels by an arm or rod running along the back of the upper plate under a raised cover or box, and is fastened by a nut at the fore end. Around this arm or rod the upper plate revolves in a direction transverse to that of the revolution of the smaller plate. By means of the revolving motion thus permitted about this arm or rod ample provision is made for any inequalities of elevation of the two ends of the forward axle occurring in actual use. Thus by means of the devices aforesaid the necessity of a king-bolt or of any contrivance of that nature is entirely dispensed with.

What I claim as my invention, and desire to secure by Letters Patent, is—

The combination of the coupling with the reach from the rear axle by means of an arm or rod extending through the upper circular plate in such form that the plate may revolve around it, substantially as above set forth.

JOHN BUNDY.

Witnesses:
  C. JORDAN,
  JOHN A. JORDAN.